United States Patent
Young et al.

(10) Patent No.: US 9,600,929 B1
(45) Date of Patent: Mar. 21, 2017

(54) SYSTEM, COMPUTER-READABLE MEDIUM AND METHOD FOR 3D-DIFFERENCING OF 3D VOXEL MODELS

(71) Applicant: NGRAIN (Canada) Corporation, Vancouver (CA)

(72) Inventors: Jonathan Young, Vancouver (CA); Andrew Woo, Vancouver (CA); Meru Brunn, Vancouver (CA)

(73) Assignee: NGRAIN (Canada) Corporation, Vancouver (CA)

( * ) Notice: Subject to any disclaimer, the term of this patent is extended or adjusted under 35 U.S.C. 154(b) by 9 days.

(21) Appl. No.: 14/557,232

(22) Filed: Dec. 1, 2014

(51) Int. Cl.
| | |
|---|---|
| *G06T 15/00* | (2011.01) |
| *G06T 17/00* | (2006.01) |
| *G06T 15/08* | (2011.01) |
| *G06T 1/60* | (2006.01) |
| *G06T 19/00* | (2011.01) |
| *G06T 11/60* | (2006.01) |
| *G06T 7/00* | (2006.01) |

(52) U.S. Cl.
CPC .............. *G06T 17/00* (2013.01); *G06T 1/60* (2013.01); *G06T 7/0046* (2013.01); *G06T 11/60* (2013.01); *G06T 15/08* (2013.01); *G06T 19/006* (2013.01)

(58) Field of Classification Search
CPC ........ G06T 7/0028; G06T 19/20; G06K 9/342
USPC ........................ 345/419, 420, 619; 382/107
See application file for complete search history.

(56) References Cited

U.S. PATENT DOCUMENTS

| | | | |
|---|---|---|---|
| 6,407,748 B1 * | 6/2002 | Xavier | ............... G06T 19/20 345/419 |
| 6,867,774 B1 | 3/2005 | Halmshaw et al. | |
| 7,050,054 B2 | 5/2006 | Halmshaw | |
| 7,218,323 B1 | 5/2007 | Halmshaw et al. | |
| 7,317,456 B1 | 1/2008 | Lee | |
| 7,420,555 B1 | 9/2008 | Lee | |

(Continued)

FOREIGN PATENT DOCUMENTS

| | | |
|---|---|---|
| WO | 0207088 A2 | 1/2002 |
| WO | 0207089 A2 | 1/2002 |

OTHER PUBLICATIONS

Jozef Doboš , Anthony Steed, 3D Diff: an interactive approach to mesh differencing and conflict resolution, SIGGRAPH Asia 2012 Technical Briefs, p. 1-4, Nov. 28-Dec. 1, 2012, Singapore, Singapore [doi>10.1145/2407746.2407766].*

(Continued)

*Primary Examiner* — Phu K Nguyen
(74) *Attorney, Agent, or Firm* — Seed Intellectual Property Law Group LLP

(57) ABSTRACT

System, computer-readable medium and method are provided for differencing (diffing) first and second sets of 3D voxel data to identify differences that may exist between the two sets. The system includes a 64-bit processor, a memory, and a display. The memory is loaded with the two sets of 3D voxel data arranged in a 64-tree data structure, wherein an occupied or empty state of each voxel is indicated by 1 bit. The processor executes a 3D voxel diffing algorithm including steps of: (i) aligning the first and second sets of 3D voxel data; (ii) making a one-to-one comparison between each voxel in the first set and a corresponding voxel in the second set to create a diff model that records differences found between the first and second sets; and (iii) displaying the content of the diff model on the display.

21 Claims, 8 Drawing Sheets

(56) References Cited

U.S. PATENT DOCUMENTS

| | | | |
|---|---|---|---|
| 7,590,264 B2 * | 9/2009 | Mattes | G06T 7/0028 382/107 |
| 7,965,290 B1 | 6/2011 | Kouznetsov et al. | |
| 8,217,939 B1 | 7/2012 | Bonciu et al. | |
| 8,401,264 B2 * | 3/2013 | Storti | G06K 9/342 345/419 |

OTHER PUBLICATIONS

Julius Kammerl, Search, Change Detection, and Compression using Octrees, PointCloudLibrary, pp. 1-27, Sep. 25, 2011.*

Besl et al., "A Method for Registration of 3-D Shapes," IEEE Transactions on Pattern Analysis and Machine Intelligence, vol. 14, No. 2, Feb. 1992, 18 pages.

Culbertson et al., "Generalized Voxel Coloring," Presented at Vision Algorithms: Theory and Practice, held in conjunction with the IEEE International Conference on Computer Vision Sep. 21-22, 1999, 16 pages.

Girardeau-Montaut et al., "Change Detection on Points Cloud Data Acquired with a Ground Laser Scanner," ISPRS WG III/3, III/4, V/3 Workshop entitled "Laser scanning 2005," Enschede, the Netherlands, Sep. 12-14, 2005, pp. 30-35.

Liverani et al., "A CAD-augmented Reality Integrated Environment for Assembly Sequence Check and Interactive Validation," Concurrent Engineering: Research and Applications, vol. 12, No. 1, Mar. 2004, pp. 67-77.

Sung, "A DDA Octree Traversal Algorithm for Ray Tracing," EUROGRAPHICS '91, F.H. Post and W. Balth (Editors), Elsevier Science Publishers B.V. (North-Holland), 1991, p. 73.

Woo et al., "Applying Volume Graphics in a Maintenance Training Environment," Interservice/Industry Training, Simulation, and Education Conference (I/ITSEC), 2005, 7 pages.

Woo et al., "Augmented Reality on Tablets in Support of MRO Performance," Interservice/Industry Training, Simulation, and Education Conference (I/ITSEC), 2012, 9 pages.

Woo et al., "Myths and Truths of Interactive Volume Graphics," Interservice/Industry Training, Simulation, and Education Conference (I/ITSEC), 2004, 10 pages.

Yuen et al., "Usage of 3D scanners towards 3D model creation in simulation and maintenance training," Interservice/Industry Training, Simulation, and Education Conference (I/ITSEC), 2013, 11 pages.

* cited by examiner

SYSTEM, COMPUTER-READABLE MEDIUM AND METHOD FOR 3D-DIFFERENCING OF 3D VOXEL MODELS

BACKGROUND

Technical Field

The present invention relates generally to processing a 3D graphics dataset, and more specifically to 3D differencing ("diffing") of 3D models using voxel data, to determine and visualize differences between the 3D models.

Description of the Related Art

Three-dimensional ("3D") digital data may be produced by a variety of devices that involve three-dimensional scanning, sampling and/or numerical modeling. For example, laser scanners generate 3D digital data. A long range laser scanner is fixed in one location and rotated to scan objects around it. Alternatively, a short range laser scanner is mounted on a device that moves around an object to be scanned. In either case, the location of each point scanned is represented as a polar coordinate since the angle between the scanner and the object and distance from the scanner to the object are known. Typically the polar coordinates are then converted to 3D Cartesian coordinates and stored along with a corresponding intensity or color value for the data point collected by the scanner.

As described above, a 3D scanning/sampling/modeling device may generate 3D digital data by collecting a complete set of (x, y, z) locations that represent the shape of an object. The term "point cloud" is used to describe such point sets including a large number of points. The data points in point cloud data are unorganized and spaced irregularly within the cloud. While in some applications point cloud data can directly be used to generate 3D images, in other applications point cloud data can be transformed to volume graphics or 3D voxel data, which can then be used to generate 3D images. Some exemplary systems and methods for transforming point cloud data to volume graphics data are disclosed in commonly owned U.S. Pat. Nos. 7,317,456 B1 and 7,420,555 B1 both entitled "METHOD AND APPARATUS FOR TRANSFORMING POINT CLOUD DATA TO VOLUMETRIC DATA," which are incorporated herein by reference. In volume graphics, volume elements (i.e., "voxels") are the base data used to represent 3D objects. Typically, voxels are simply pixels that have a third coordinate z in addition to x and y coordinates in a Cartesian coordinate system (though voxels may take various other forms, also). In other words, voxels are equally sized cubes that form a discretely defined 3D space.

Volume graphics represent a promising way to achieve the degree of realism required for high quality 3D simulations and visualization applications because volume models can contain all the surface and internal characteristics of a real object. This is in contrast to, for example, polygon-based graphics, in which a mesh of polygons is used to represent only the surfaces of a 3D object.

3D voxel data are rendered to produce a 2D image on a suitable output device, such as a display or a printer. As used herein, the term "render" means to produce a 2D graphics image on an output device (e.g., a display screen) from a 3D graphics data model, and typically involves creating an image using color, normal (which indicates a direction of illumination to define shine), intensity (brightness/darkness), texture, etc., to give the image a realistic look.

Software available from NGRAIN (Canada) Corp. of Vancouver B.C., Canada, is suited for generating voxel data which can be rapidly rendered and also readily manipulated in real time. Briefly, NGRAIN® technology permits 3D modeling of an object, wherein each of multiple parts or layers forming the object is represented as a voxel set each consisting of one or more voxels. According to NGRAIN® technology, it is possible to render a large number of voxel sets representing multiple parts or layers together, while allowing a user to manipulate each part or layer separately in 3D space. For example, the user may break up the parts or layers to display an exploded view of an object, or may peel off an outer layer of the object to reveal its inner layer. Various details of NGRAIN® technology are described in commonly owned Patent Cooperation Treaty Publication No. WO 02/07088 A2 entitled "LIGHTING ADJUSTMENT METHODS AND APPARATUS FOR VOXEL DATA," commonly owned Patent Cooperation Treaty Publication No. WO 02/07089 A2 entitled "APPARATUS AND METHOD FOR ASSOCIATING VOXEL INFORMATION WITH DISPLAY POSITIONS," commonly owned U.S. Pat. No. 6,867,774 B1 entitled "METHOD AND APPARATUS FOR TRANSFORMING POLYGON DATA TO VOXEL DATA FOR GENERAL PURPOSE APPLICATIONS," commonly owned U.S. Pat. No. 7,050,054 B2 entitled "METHOD, APPARATUS, SIGNALS AND CODES FOR ESTABLISHING AND USING A DATA STRUCTURE FOR STORING VOXEL INFORMATION," commonly owned U.S. Pat. No. 7,218,323 B1 entitled "METHOD AND SYSTEM FOR RENDERING VOXEL DATA WHILE ADDRESSING MULTIPLE VOXEL SET INTERPENETRATION," commonly owned U.S. Pat. No. 7,965,290 B1 entitled "METHOD, SYSTEM, AND DATA STRUCTURE FOR PROGRESSIVE LOADING AND PROCESSING OF A 3D DATASET," and commonly owned U.S. Pat. No. 8,217,939 B1 entitled "METHOD AND SYSTEM FOR CALCULATING VISUALLY IMPROVED EDGE VOXEL NORMALS WHEN CONVERTING POLYGON DATA TO VOXEL DATA," which are all incorporated herein by reference. Additional details of NGRAIN® technology can also be found in an article entitled "Myths and Truths of Interactive Volume Graphics" published in I/ITSEC 2004 Conference, and in an article entitled "Applying Volume Graphics in a Maintenance Training Environment" published in I/ITSEC 2005 conference.

BRIEF SUMMARY

Voxel data, such as those generated using NGRAIN® technology, are particularly suited for use in augmented reality (AR) applications. For example, in a mechanical training application, an AR image may be generated in which a 3D voxel model of a machine including a part to be removed/repaired may be superimposed on an image of an actual machine that includes the part. A trainee mechanic may view the AR image, in which the 3D voxel model of the part to be manipulated (removed/repaired) is highlighted or annotated with a callout box, to visually confirm which actual part is to be removed/repaired. 3D voxel data based on NGRAIN® technology as used in an AR session can be readily manipulated in real time such that a viewer/user can observe the result of 3D voxel data manipulation (e.g., removing a voxel model of a part from a voxel model of a machine and rotating the voxel model of the removed part) against the backdrop of the image of the actual machine.

In a mechanical training application prepared to instruct a mechanic to first remove part A and thereafter to remove part B from a machine, if the mechanic has incorrectly removed actual part B first (or part B is missing from the machine for some reason), then an AR training image includes a 3D voxel model of the machine including both parts A and B superimposed on an image of the actual machine that includes only part A. The AR image may appear confusing to the mechanic because the state of the 3D voxel model does not match the state of the actual machine. At the same time, the AR image does not contain sufficient information to actually alert the mechanic that he/she has incorrectly removed actual part B before removing actual part A.

A need exists for a system, computer-readable medium and method that may be used to verify the current state of an actual object in an AR session and to alert a user/viewer if the current state deviates from an ideal state of the object. In the above example, a system, computer-readable medium and method would be highly helpful that may be used to determine that actual part B, which is supposed to be still included in the machine, is missing from the machine and to alert the user/viewer that part B is missing.

In accordance with some embodiments of the present invention, one way to verify the current state of an actual object in an AR session is to compare a 3D scanned model of the current state of the actual object with a 3D model that represents an ideal state of the object. If any discrepancy is found, such as part B missing from the actual object, then the 3D voxel model of part B may be superimposed on an image of the object to alert the viewer that part B is missing from the object. As used herein, comparing two 3D models to output differences between the two is referred to as differencing or "diffing" the 3D models. Diffing of 3D models may be used in various 3D applications and settings, not limited to AR settings. For example, different versions of a 3D model under development may be "diffed" to determine changes made between the versions, or to determine any variations between the as-designed vs. the as-built. As another example, 3D voxel models of the same object, which are created using different methods, may be "diffed" to determine any differences therebetween. As a further example, 3D diffing may be used in 3D printing to achieve rapid incremental prototyping of a new product. Specifically, a product prototype is 3D scanned to generate a 3D voxel model, which a designer may modify/update to generate an updated 3D voxel model. The original 3D voxel model and the updated 3D voxel model are "diffed" to create a diff model that represents the differences between the two 3D voxel models. The diff model, in a 3D printer readable file, may then be loaded to a 3D printer to 3D-print a physical representation of the content of the diff model, which can be appended to the current prototype to create an updated prototype through the guidance of AR, for example.

According to one aspect of the present invention, a computer-implemented system is provided, which includes a 64-bit processor, a memory, and a display. The memory is configured to be loaded with a first set of 3D voxel data of an object and a second set of 3D voxel data. The first and second sets of 3D voxel data are arranged in a 64-tree data structure. Briefly, a 64-tree data structure is an octree-like data structure. An octree=(2×2×2=8) is a tree data structure in which each internal node has eight children nodes, while a 64-tree=(4×4×4=64) is a tree data structure in which each internal node has sixty-four children nodes. In the first and second sets of 3D voxel data, an occupied or empty state of each voxel is indicated by 1 bit in the 64-tree data structure. For example, 1 may indicate an occupied voxel and 0 may indicate an empty voxel. Thus, a sequence of 1010 may indicate a row of an occupied voxel, an empty voxel, another occupied voxel and another occupied voxel. The 64-bit processor, when loaded with computer-executable instructions, executes a 3D voxel diffing algorithm including generally three steps. The first step aligns the first set of 3D voxel data and the second set of 3D voxel data. The second step makes a rapid one-to-one comparison between each voxel in the first set of 3D voxel data and a corresponding voxel in the second set of 3D voxel data to create a diff model that records differences found between the first and second sets of 3D voxel data. The 64-bit processor can rapidly make a one-to-one comparison of bits indicative of occupied or empty states of voxels arranged in the 64-tree data structure between the first and second sets of 3D voxel data. The specific arrangement of 3D voxel data in the 64-tree data structure, which permits rapid comparison between two sets of 3D voxel data in one instruction by a 64-bit processor, results in fast 3D model diffing operation that has not been available in the past. The third step of the diffing routine displays the content of the diff model on the display. For example, an image of the differences found between the two sets of 3D voxel data may be superimposed on one of the two sets of 3D voxel data in a visually distinguishable manner (e.g., highlighted). Alternatively or additionally, a numeric similarity value indicative of the degree of similarity between the two sets of 3D voxel data may be calculated and displayed. In one example, similarity value 0 means there is no similarity between the two sets and 1 means the two sets are identical to each other.

According to another aspect of the invention, a non-transitory computer-readable storage medium is provided, which includes computer-executable instructions for executing a diffing routine including generally three steps. The first step aligns a first set of 3D voxel data of an object and a second set of 3D voxel data by matching a level of detail (LOD) of the first set and an LOD of the second set. For example, a LOD may be defined as an actual dimension of an object that is 3D-modeled divided by a number of voxels to which the actual dimension is mapped (e.g., 3-inch long object mapped to 9 voxels; LOD=3/9=1/3). The second step makes a one-to-one comparison between each voxel in the first set of 3D voxel data and a corresponding voxel in the second set of 3D voxel data to create a diff model that records differences found between the first and second sets of 3D voxel data. The third step displays the content of the diff model on a display.

According to a further aspect of the invention, a computer-implemented method is provided, which includes generally two steps. The first step loads, to a memory device, a first set of 3D voxel data of an object and a second set of 3D voxel data. The second step executes a diffing routine on a processor coupled to the memory device. The diffing routine includes generally three sub-steps. The first sub-step aligns a first set of 3D voxel data of an object and a second set of 3D voxel data by matching a level of detail (LOD) of the first set and an LOD of the second set. The second sub-step makes a one-to-one comparison between each voxel in the first set of 3D voxel data and a corresponding voxel in the second set of 3D voxel data to create a diff model that records differences found between the first and second sets of 3D voxel data. The third sub-step displays the content of the diff model on a display coupled to the processor.

DETAILED DESCRIPTION

Voxels provide the best geometric data structure to compare two 3D models against each other to determine their differences, as compared to other types of 3D models such as polygon-mesh 3D models, higher-order surfaces (e.g., B-splines) 3D models and point cloud 3D models. This is because voxels, unlike polygon-mesh and other surface-based 3D models, represent an internal structure of an object and permit comparison between the two internal structures, and also because voxels, unlike point cloud 3D models, are organized in a 3D array of a volume unit (i.e., "voxel") which permits a one-to-one comparison of voxels between two voxels sets. According to various embodiments of the present invention, to achieve a rapid one-to-one comparison of voxels between two voxel sets, a novel combination of a 64-bit processor and the use of a 64-tree data structure for arranging the voxel sets is employed, as will be more fully described below.

When 3D models are initially created as non-voxel based models, such as polygon-mesh and other surface-based 3D models and point cloud 3D models, those models must be first transformed into 3D voxel data. Various methods for transforming point cloud data to voxel data are disclosed in U.S. Pat. Nos. 7,317,456 and 7,420,555 incorporated above, and various methods for transforming polygon data to voxel data are disclosed in U.S. Pat. Nos. 6,867,774 and 8,217,939 incorporated above. In some cases when the point cloud data at hand are sparse, they may be first transformed to polygon data using conventional 3D scanner software, and then the resulting polygon data may be transformed to voxel data. In general, voxel models are rarely the starting point for diffing, but by first converting non-voxel models to voxel models as needed, one could perform rapid diffing of any two types of 3D models, such as a polygon model vs. a point cloud model, between two polygon models, between two point cloud models, etc., according to various embodiments of the present invention. As used herein, a "3D voxel model," a "set of 3D voxel data" and a "3D voxel data set" are used synonymously and interchangeably to refer to a group of voxels that collectively model a discrete object.

Figure 1:
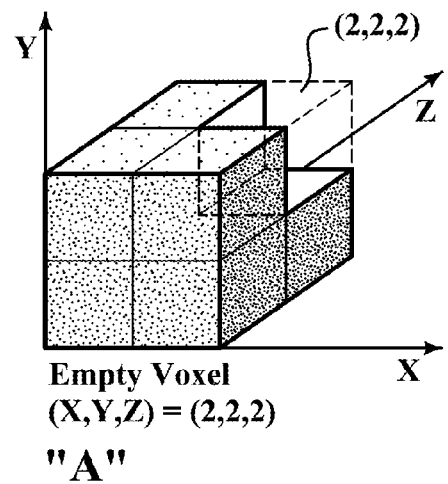
FIG. 1 illustrates a process of differencing (or "diffing") a first set of voxel data "A" and a second set of voxel data "B" to identify differences between the two sets.
Figure 1:
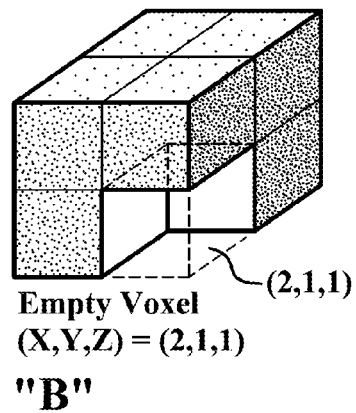
Figure 1:
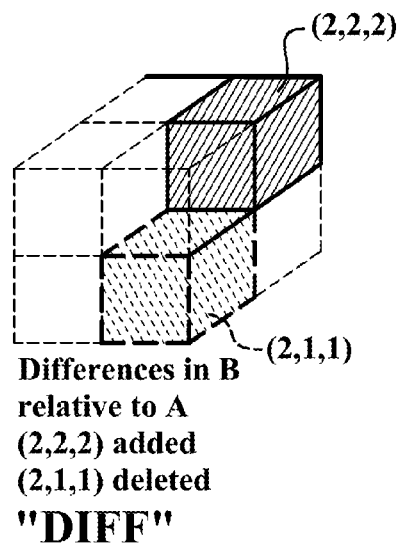

FIG. 1 illustrates the process of differencing (or diffing) a first set of voxel data "A" and a second set of voxel data "B" to generate a difference model (or a "duff" model) that indicates differences found between the first and second sets of voxel data. The voxel data in the illustrated example is arranged in a Cartesian coordinate having X, Y and Z axes, and has a data size of 2×2×2 along x-, y- and z-axes. The first voxel set "A" has eight voxel positions (x, y, z)=(1,1,1), (1,1,2), (1,2,1), (1,2,2), (2,1,1), (2,1,2), (2,2,1) and (2,2,2), of which seven positions are occupied while (2,2,2) is empty. In a 3D voxel model, a voxel position that is occupied is called an "occupied voxel" and a voxel position that is not occupied is called an "empty voxel," which corresponds to nothing (space) in the object represented by the 3D voxel model. The second voxel "B" also has the same eight voxel positions, of which seven are occupied voxels while (2,2,1) is an empty voxel.

Differencing or diffing the first and second sets of voxel data "A" and "B" means identifying differences between the two sets. In various exemplary embodiments, the identified differences are stored in a "duff" model (e.g., a "duff" file). In the example of FIG. 1, the result of comparing the second voxel set "B" relative to the first voxel set "A" is organized in a diff model ("DIFF") that indicates two voxels (2,2,2) and (2,1,1) embody differences between the two sets. Voxel (2,2,2) is an empty voxel in set "A" but is an occupied voxel in set "B". Voxel (2,1,1) is an occupied voxel in set "A" but is an empty voxel in set "B." The content of the diff model may then be superimposed on one of the two sets of 3D voxel data to visually indicate the differences between the two sets. For example, voxels (2,2,2) and (2,1,1) may be highlighted or otherwise rendered visually distinguishably from the rest of the voxels in one of the sets the 3D voxel data on a display such that a viewer can readily observe the differences. Furthermore, to differentiate a voxel that is "added" from a voxel that is "deleted," two different highlighting or other visual indications may be used. For example, voxel (2,2,2) that is an empty voxel in set "A" but is added to be an occupied voxel in set "B" may be shown in red, while voxel (2,1,1) that is an occupied voxel in set "A" but is deleted to be an empty voxel in set "B" may be shown in blue. Thus, the viewer may appreciate not only any differences that may exist between the two voxel sets, but also what type of difference exists between the two sets—additions or deletions. Methods and algorithms for identifying differences, additions and deletions will be more fully described below in reference to FIGS. 6A-6D.

Alternatively or additionally, the result of differencing two sets of 3D voxel data to identify differences between the two may be expressed in a numeric value that indicates how similar (or dissimilar) the two sets are. For example, a similarity value may be used having a range from 0 to 1, with 1 indicating that the two sets are identical to each other and 0 indicating that the two sets are completely different. Value 0.5 indicates that one half of the voxels in the first set of 3D voxel data are different from their corresponding voxels in the second set. In some embodiments, a similarity value may be calculated as the ratio of a number voxels that are the same between the two sets of 3D voxel data relative to a total number of voxels included in one of the two sets. Referring to the example of FIG. 1, a total number of voxels in the first voxel set "A" is eight (8). Two voxels (2,2,2) and (2,1,1) are different between the two sets, while the remaining six (6) voxels are the same between the two sets. Thus, a similarity value of this example can be calculated as 6/8=75%.

Alternatively or additionally, a dissimilarity value may be calculated to indicate how dissimilar the two sets of 3D voxel data are in a range from 0 to 1, with 1 indicating that the two sets are completely different from each other and 0 indicating that the two sets are identical. A dissimilarity value of the example of FIG. 1 may be calculated as the ratio of a number of different voxels (2 in this case) relative to a total number of voxels included in one of the two sets of 3D voxel data (8 in this case), which is 2/8=25%.

Further additionally or alternatively, an addition value and a deletion value may be calculated to indicate how much is added and how much is deleted between the first set and the second set of 3D voxel data. Continuing with the example of FIG. 1, an "addition" value that indicates how much is added to the first set to produce the second set (i.e., how many empty voxels in the first set turn into occupied voxels in the second set) may be calculated as the ratio of a number of added voxels (1 in this case, because only voxel (2,2,2) is added) relative to the total number of voxels included in one of the two sets (8 in this case), which is 1/8=12.5%. Similarly, a "deletion" value that indicates how much is deleted from the first set to produce the second set (i.e., how many occupied voxels in the first set turn into empty voxels in the second set) may be calculated as the ratio of a number of deleted voxels (1 in this case, because only voxel (2,1,1) is deleted) relative to the total number of voxels included in one of the two sets (8 in this case), which is 1/8=12.5%.

Various other methods of calculating a value that indicates similarity, dissimilarity or differences (e.g., additions or deletions) between two sets of 3D voxel data would be apparent to those skilled in the art and are within the scope of the present invention.

Thus, when a user/viewer executes a differencing routine on two sets of 3D voxel data, a diff model is created that records differences found between the two sets of 3D voxel data. A system, computer-readable medium and method of the present invention are configured to display the content of the diff model to a user so that the user can observe and appreciate the differences. The display may be graphic in the form of the differences superimposed on one of the two sets of 3D voxel data in a visually distinguishable manner (e.g., highlighted). Alternatively or additionally the display may be numeric in the form of a similarity value, a dissimilarity value, an addition value and/or a deletion value, which are calculated based on the content of the diff model.

Figure 2:
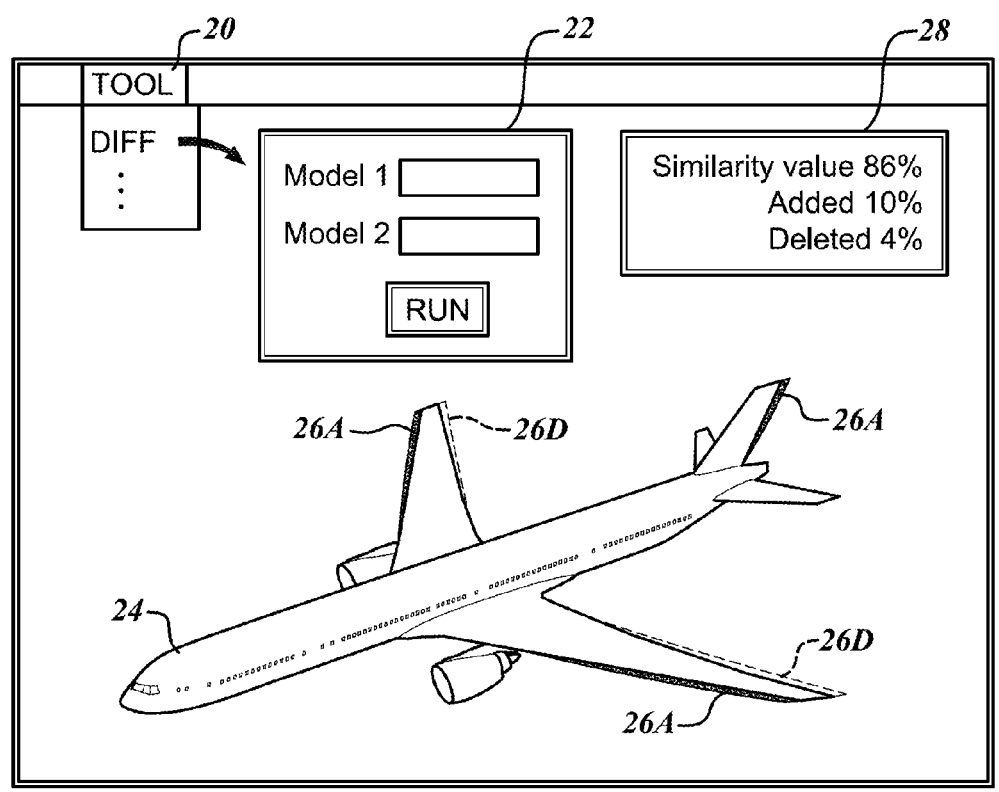
FIG. 2 is a screen shot of a sample user interface that allows a user to execute a diffing routine and observe the differences found between two sets of 3D voxel data.

FIG. 2 is a screen shot of an exemplary user interface that allows a user to execute a diffing routine and observe the differences found between two sets of 3D voxel data. From a pull-down menu "TOOL" 20 the user selects a "DIFF" routine, which causes a user-prompt window 22 to appear. The user enters model names 1 and 2 of the first and second sets of 3D voxel data to be diffed, and selects a "RUN" button to execute the diffing routine. In the illustrated example, each of the two models represents an airplane 24. The diffing routine generates a diff model that records differences found between the two sets of 3D voxel data each representing the airplane. The diffing routine displays the content of the diff model in the form of the differences 26A and 26D indicated in a visually distinguishable manner and superimposed on the first set of the 3D voxel data. In the illustrated example, the differences 26A are shown as stippled areas to represent "added" portions, which are not present in the first set of 3D voxel data but are added to be present in the second set of 3D voxel data. The difference(s) 26D are shown as broken-lined areas to represent "deleted" portions, which are present in the first set of 3D voxel data but are deleted to be not present in the second set of 3D voxel data. The diffing routine may alternatively or additionally display the content of the diff model in the form of a numeric similarity value, a numeric dissimilarity value, an addition value (% of voxels that are added) and/or a deletion value (% of voxels that are deleted), as described above. In the example of FIG. 2, a value window 28 displays "similarity value 86%," "added % [addition value] 10%" and "deleted % [deletion value] 4%," which are calculated based on the content of the diff model.

Such visualization and quantification of differences between two sets of 3D voxel data resulting from diffing the two sets are highly useful in various applications and settings. For example, when multiple 3D voxel models are created to represent a single object, differencing may be performed to identify any differences that may exist among the multiple 3D voxel models. As a specific example, a 3D voxel model of an object may be created by 3D scanning the object to generate a point cloud model and transforming the point cloud model to the 3D voxel model. Another 3D voxel model of the same object may be created by transforming a polygon-mesh model, a spline-based model, or a CAD model of the object to the 3D voxel model. Though these 3D voxel models represent the same object and are supposed to be identical, discrepancy may be introduced due to imperfection in the original modeling or in methods used to transform the original models to the 3D voxel models. Even when the same 3D scanner is used to scan the same objet multiple times, resulting point cloud models may be different depending on a particular arrangement used in each scanning session such as the orientation of the object relative to the 3D scanner. Thus, 3D voxel models created based on these point cloud models may also be different. A diffing operation according to the present invention is capable of rapidly identifying any differences that may exist between two sets of 3D voxel data and displaying the differences to a user. The user may then visually observe the differences, may choose one 3D voxel model out of plural 3D voxel models based on evaluation of the differences, or may combine the 3D voxel models to create one optimal 3D voxel model by, for example, taking an average of the differences (averaging out the differences).

Another example of using the result of a diffing operation that quantifies or visualizes differences between two sets of 3D voxel data is to use the result to evaluate similarity between two 3D voxel models at different Levels of Detail (LOD). If a similarity value between the two 3D voxel models at a lower LOD is the same as a similarity value of the same two 3D voxel models at a higher LOD, this means that no details (which define the degree of similarity between the two 3D voxel models) are lost by going from the higher LOD to the lower LOD. In this case the 3D voxel models at the lower LOD may be selected for storage and further processing, because they require less storage space and processing resources than the 3D voxel models at the higher LOD. Such selection process may be used, for example, when converting a point cloud data set (or a polygon data set) to a 3D voxel data set to find the optimal LOD at which to create and store the 3D voxel data set.

Figure 3A:
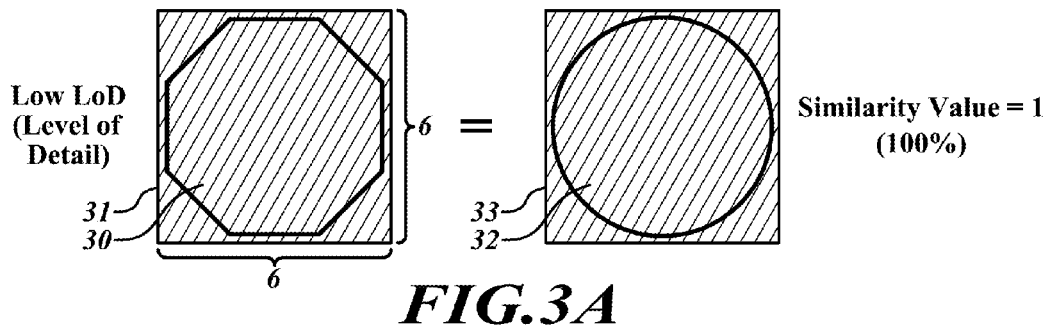
FIGS. 3A-3C illustrate an octagon object and a circle object, which are 3D-voxel-modeled at a low Level of Detail (LOD), at a medium LOD, and at a high LOD, respectively.

FIG. 3A shows an octagon object 30 and a circle object 32, which are respectively represented in 3D voxel models each consisting of a single voxel 31 and 33 of size 6×6. (For ease of illustration FIG. 3A is illustrated in 2D though one skilled in the art will appreciate that the illustrated concept is equally applicable in 3D context.) At this low LOD, the single voxel 31 that contains the octagon object 30 is an occupied voxel, and the single voxel 33 that contains the circle object 32 is an occupied voxel. The first 3D voxel model consisting of the occupied voxel 31 is identical to the second 3D voxel model consisting of the occupied voxel 33 and, therefore, a similarity value between the two 3D voxel models at the low LOD is 1 or 100%.

Figure 3B:
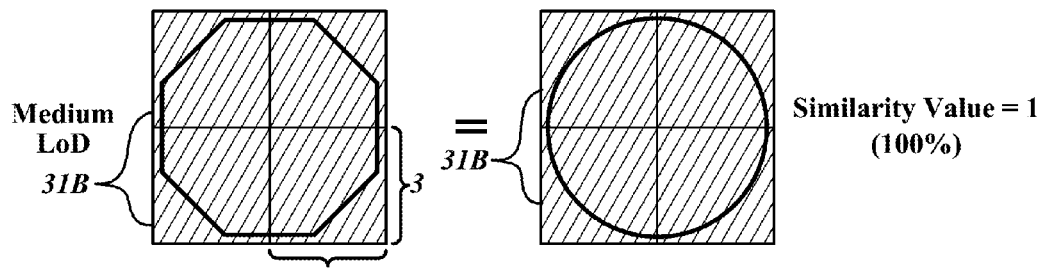

FIG. 3B shows the same octagon object 30 and the circle object 32, which are respectively represented in 3D voxel models each consisting of four voxels 31B and 33B of size 3×3. At this medium LOD, each of the four voxels 31B contains at least part of the octagon object 30 and thus is each an occupied voxel. Similarly, each of the four voxels 33B contains at least part of the circle object 32 and thus is each an occupied voxel. Thus, the 3D voxel model of the octagon object 30 consists of four occupied voxels 31B, which is identical to the 3D voxel model of the circle object 32 also consisting of four occupied voxels 33B. Similar to the case of the low LOD illustrated in FIG. 3A, a similarity value between the two 3D voxel models at the medium LOD is calculated to be 1 or 100%.

Figure 3C:
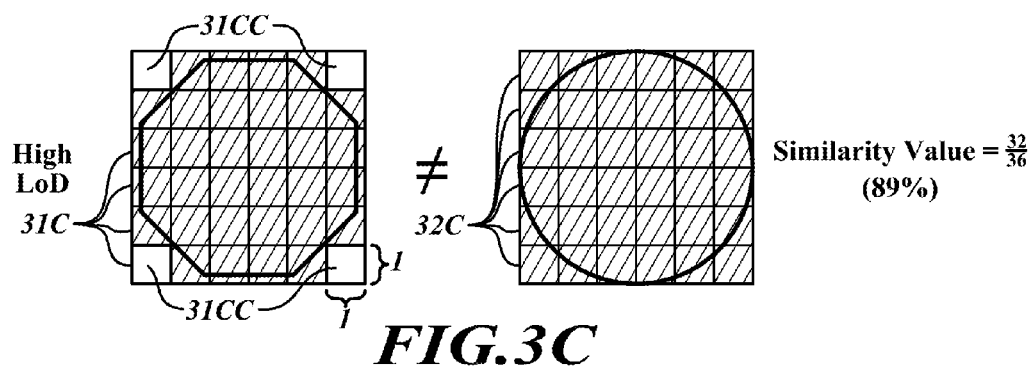

FIG. 3C shows the same octagon object 30 and the circle object 32, which are respectively represented in 3D voxel models each consisting of thirty-six (36) voxels 31C and 33C of size 1×1. At this high LOD, the octagon object 30 occupies each of 32 voxels 31C but does not occupy four corner voxels 31CC in the first 3D voxel model. On the other hand, the circle object 32 occupies each of all 36 voxels 33C in the second 3D voxel model. Therefore, the first 3D voxel model of the octagon object 30 consists of 32 occupied voxels 31C and 4 empty voxels 21CC, while the second 3D voxel model of the circle object 32 consists of 36 occupied voxels 33C. A similarity value between the two 3D voxel models can be calculated as a number of identical voxels (32) divided by the total number of voxels included in one of the 3D voxel models (36), i.e., 32/36=89%.

The difference between the medium LOD of FIG. 3B and the high LOD of FIG. 3C is meaningful, in that the 3D voxel models in the high LOD contain more details (i.e., the four corner voxels 31CC are empty in the first voxel model but are occupied in the second voxel model) than the 3D voxel models in the medium LOD. The additional details included in the high LOD result in a similarity value of 89% at the high LOD, which is lower than a similarity value of 100% at the medium LOD. On the other hand, no meaningful difference exists between the low LOD of FIG. 3A and the medium LOD of FIG. 3B, resulting in the same similarity value of 100% at both of the low LOD and the medium LOD. Between the medium LOD and the low LOD, the low LOD may be selected because it contains the same details (information) as the medium LOD and because it requires less storage space and processing resources than the medium LOD.

In summary, similarity values between two 3D voxel models may be calculated at multiple Levels of Detail (LODs), and if two or more LODs have similarity values that are the same or close within a defined range (e.g., difference of a few %), then the lowest LOD is selected at which to define the 3D voxel models. In the example of FIGS. 3A and 3B, the low LOD of FIG. 3A is selected to define the 3D voxel models out of the low LOD and the medium LOD that achieve the same similarity value. On the other hand, in the example of FIGS. 3B and 3C, the medium LOD of FIG. 3B may be selected to define the 3D voxel models to save storage space and processing resources than the high LOD, or the high LOD of FIG. 3C may be selected to define the 3D voxel models that contain additional details not captured at the medium LOD.

In typical applications according to various embodiments of the present invention, 3D voxel models can be created to reflect a LOD of 1/2-1/10 (inch/voxel) resolution. For example, an object that is 5 inches long may be mapped to 25 voxels along a 3D voxel axis, at the LOD of 5/25=1/5 (inch/voxel).

Figure 4A:
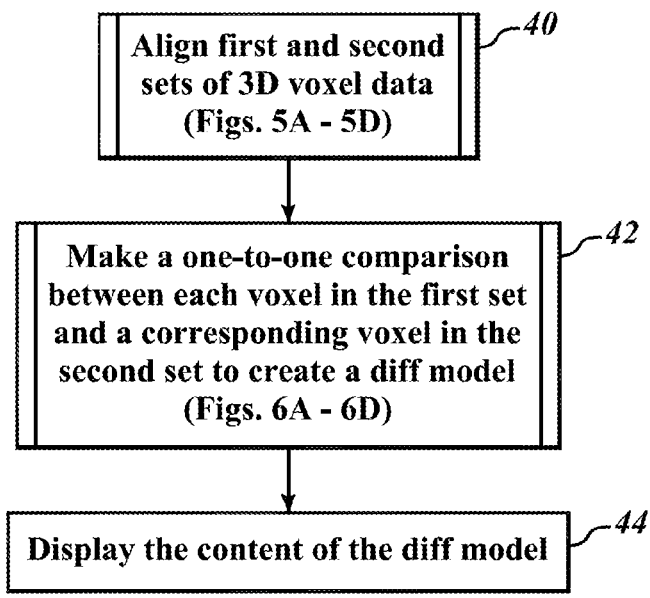
FIG. 4A is an overall flow chart of a diffing routine which, when executed by a processor/computer, operates to difference two sets of 3D voxel data to create a diff model and to display the content of the diff model.

FIG. 4A is an overall flow chart of a diffing routine according to embodiments of the present invention which, when executed by a processor/computer, operates to difference a first set of 3D voxel data and a second set of 3D voxel data to create a diff model that records differences found between the first and second sets of 3D voxel data. The processor/computer is coupled to a memory device in which the two sets of 3D voxel data are loaded. The processor is embodied in a 64-bit processor capable of rapidly executing a diffing operation of 3D voxel data, which are advantageously arranged in a 64-tree (i.e., a Tetrasexagesimal tree or a Hexacontatetra tree)_data structure, as will be more fully described below.

In step 40, the diffing routine aligns the first set of 3D voxel data with the second set of 3D voxel data. Further details of step 40 will be described below in reference to FIGS. 5A-5D. In step 42, the diffing routine makes a one-to-one comparison between each voxel in the first set of 3D voxel data and a corresponding voxel in the second set of 3D voxel data to create a diff model that records differences found between the first and second sets of 3D voxel data. Details of step 42 will be described below in reference to FIGS. 6A-6D. In step 44, the content of the diff model is displayed on a screen. The display may be graphic in the form of the differences superimposed on one of the sets of 3D voxel data in a visually distinguishable manner, and/or numeric in the form of a similarity value, a dissimilarity value, an addition value and/or a deletion value, as shown in FIG. 2.

Figure 4B:
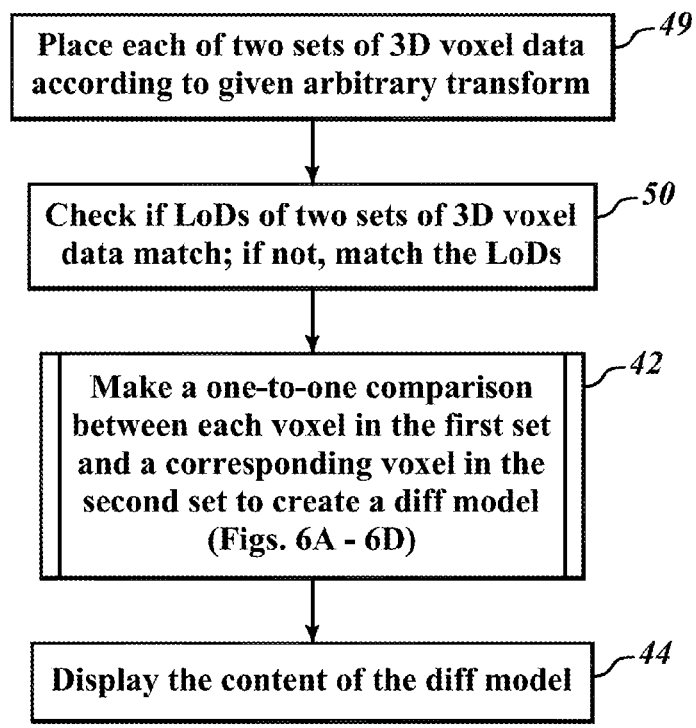
FIG. 4B is a flow chart of an alternative alignment subroutine, which may be used to manually align the two sets of 3D voxel data to be diffed.

It should be noted that different techniques are available to align two objects, besides the process to be described below in reference to FIGS. 5A-5D. For example, see a manual alignment process of FIG. 4B. If the goal is to find the difference between two objects at a given arbitrary alignment, start with step 49, then step 50 (the same as step 50 in FIG. 5A), and then jump to step 42 (the same as step 42 of FIG. 4A). In step 49, each object is first placed at such a given arbitrary alignment. Then in step 50 the voxel LODs are matched to the largest common size (i.e., the lowest LOD). Using the larger common size instead of the smaller common size allows for writing each voxel once to a new resolution without having holes in the new model. In step 42 the bitwise (one-to-one) comparisons between each voxel in the two models (voxel sets) to differentiate voxels can be performed. The result of the voxel diffing can then be displayed in step 44, which is the same as step 44 of FIG. 4A.

Figure 5A:
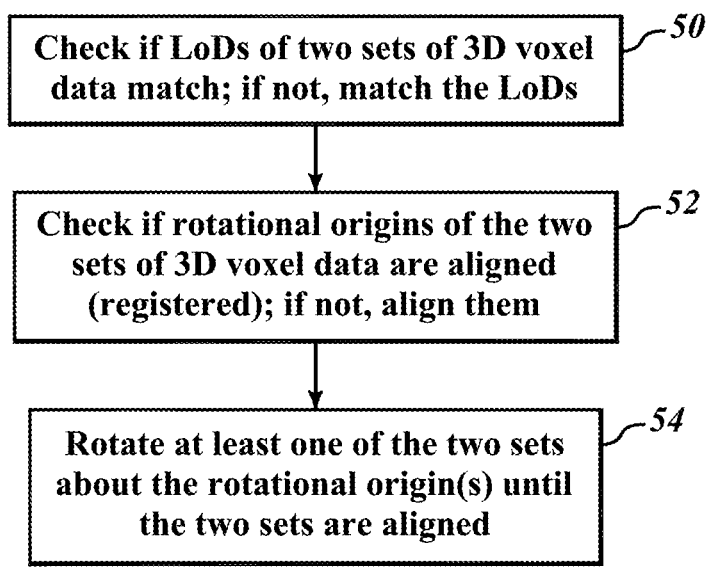
FIG. 5A is a flow chart of an alignment subroutine, which is part of the diffing routine of FIG. 4A and which aligns the two sets of 3D voxel data to be diffed.

Alternatively, if the goal is to "automatically" align the two objects in the closest alignment possible, start with step 40 of FIG. 4A. FIG. 5A is a detailed flow chart of an alignment routine (step 40 in FIG. 4A) which, when executed by the processor/computer, operates to align the first set of 3D voxel data and the second set of 3D voxel data to be "diffed." The alignment routine includes generally two sub-routines: matching a level of detail (LOD) of the first set of 3D voxel data and an LOD of the second set of 3D voxel data (scaling sub-routine; see step 50), and rotating at least one of the two sets of 3D voxel data relative to the other set to align the two sets of 3D voxel data (rotation sub-routine; see steps 52 and 54). The rotation sub-routine may be further broken down into two operations: finding and registering (aligning) rotational origins of the two sets of 3D voxel data (step 52) and rotating at least one of the two sets of 3D voxel data about the rotational origin(s) (step 54).

In some cases two sets of 3D voxel data as loaded to a memory device may be already partially or fully aligned. For example, when the same 3D scanner at a fixed location/orientation is used to repeatedly create point cloud models of an object, sets of 3D voxel data that are respectively created from these point cloud models may be already aligned. In most other cases, however, two sets of 3D voxel data are not aligned or their alignment status (whether they are aligned or not) is unknown. Though there have been prior attempts to align two sets of 3D voxel data in the past, which would be a required step before executing a one-to-one comparison of voxels between the two sets of 3D voxel data, they were not sufficiently reliable to serve as a basis for carrying out a one-to-one comparison nor were sufficiently fast to achieve rapid execution of a diffing operation. Embodiments of the present invention provide a novel routine of achieving the alignment task as outlined in the flow chart of FIG. 5A.

In step 50, the alignment routine first checks whether an LOD of the first set of 3D voxel data matches an LOD of the second set of 3D voxel data. This is done by comparing an LOD stored in association with the first set with an LOD stored in association with the second set. If the LODs do not match, the alignment routine matches the LOD of the first set and the LOD of the second set by converting at least one of the two sets. In various embodiments, the alignment routine modifies one of the voxel data sets having a higher LOD to a voxel data set having a lower LOD that is the same as the LOD of the other set. Converting a higher LOD to a lower LOD (e.g., converting FIG. 3B to FIG. 3A) is computationally less intensive than the other way around because information about each of the voxels at a higher LOD (4 voxels in FIG. 3B) are known and can be combined to generate information about each voxel at a lower LOD (1 voxel in FIG. 3A). For example, each of the 4 voxels in FIG. 3B is associated with occupancy information (value 1 indicating an occupied voxel and value 0 indicating an empty voxel) and attributes information such as an RGB color value, a normal vector (which indicates a direction of illumination to define shine), an intensity value (which defines brightness and darkness), weight, density, temperature, etc. of each occupied voxel. The information about the 4 voxels at the higher LOD of FIG. 3B may be combined (added, averaged, weight-averaged, etc.) to generate information about the 1 voxel at the lower LOD of FIG. 3A. For example, if one or more of the 4 voxels at the higher LOD of FIG. 3B are occupied voxels, the 1 voxel at the lower LOD of FIG. 3A may be determined to be an occupied voxel. RGB color values of the 4 voxels at the higher LOD of FIG. 3B may be averaged or otherwise combined to produce one RGB color value for the 1 voxel at the lower LOD of FIG. 3A. As another example, normal vector values of the 4 voxels at the higher LOD of FIG. 3B may be added together to generate one normal vector value for the 1 voxel at the lower LOD of FIG. 3A.

On the other hand, converting a lower LOD up to a higher LOD (e.g., converting FIG. 3B to FIG. 3C) typically requires remapping an actual object to a higher-LOD voxel data set and requires generation of new information that was not captured in the lower-LOD voxel data set. In the example of FIGS. 3B and 3C, the lower-LOD voxel data set of FIG. 3B does not include any empty voxel, while the higher-LOD voxel data set of FIG. 3C includes four empty voxels 31CC at the four corners. Thus, information about these empty voxels 31CC needs to be newly generated when the lower-LOD voxel data set is converted up to the higher-LOD voxel data set, which is computationally more intensive than the case of converting a higher-LOD voxel data set down to a lower-LOD voxel data set.

Figure 5B:
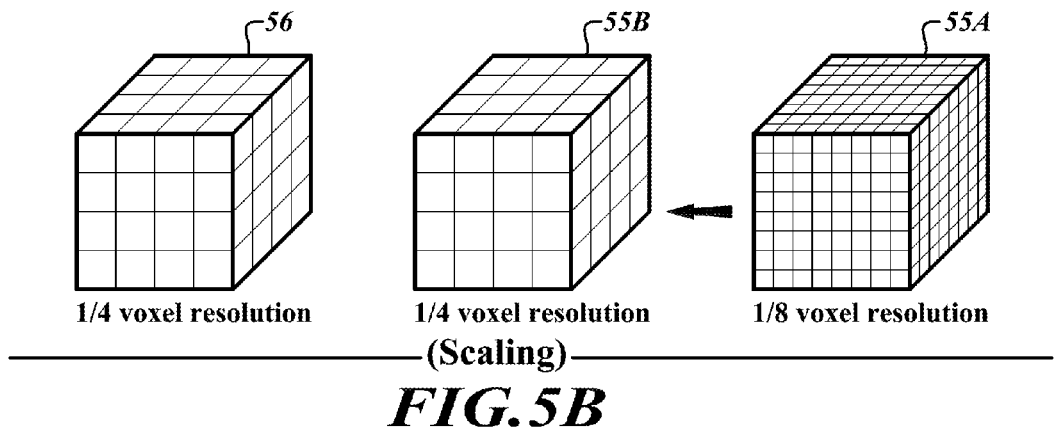
FIGS. 5B-5D illustrate a process of aligning the two sets of 3D voxel data.

FIG. 5B illustrates a process of converting a first set of 3D voxel data 55A having a higher LOD to a modified first set of 3D voxel data 55B having a lower LOD that matches the LOD of a second set of 3D voxel data 56. In the illustrated example, the LOD of the first set of 3D voxel data 55A is 1/8 (inch/voxel) and the LOD of the second set of 3D voxel data 56 is 1/4 (inch/voxel). The first set of 3D voxel data 55A having LOD of 1/8 is converted down to the modified first set of 3D voxel data 55B having LOD of 1/4, which is the same as the LOD of the second set of 3D voxel data 56.

Referring back to FIG. 4B, if the goal is to use a given arbitrary alignment for the voxel differentiation, a user can place each object at the given arbitrary alignment in step 49. Then, in step 50, the LODs of both objects are matched to be the same at the largest common size (i.e., at the lowest LOD), by scaling the object with the smaller (i.e., higher LOD) size up to the larger common size. Using the large common size instead of the smaller common size allows for writing each voxel once to a new resolution without having holes in the new model.

Figure 5C:
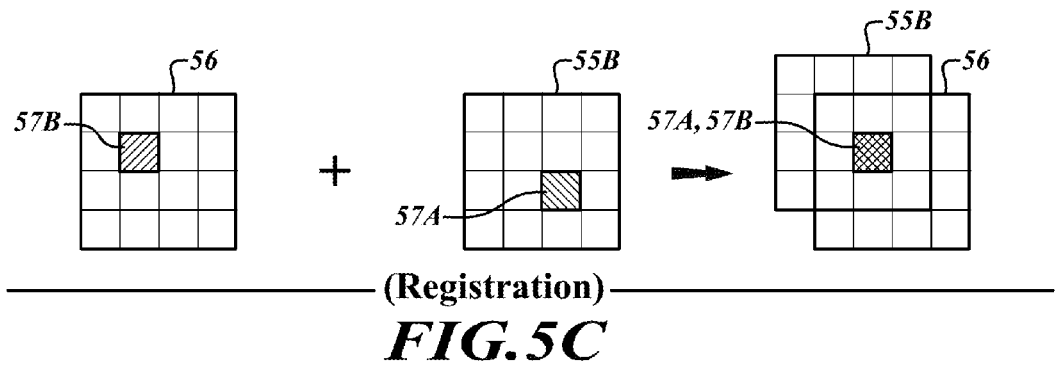

Returning to FIG. 5A, in step 52, if the goal is to automatically find the closest alignment between models, the alignment routine next checks whether rotational origins of the two sets of 3D voxel data are aligned (registered) and, if not, aligns them. To this end, one or more voxels representing a part of an object modeled by a set of 3D voxel data, which is suited to serve as a rotational origin of the set of 3D voxel data, may be pre-defined or otherwise found. A rotational origin may be an origin of a set of 3D voxel data defined when the set of 3D voxel data is created, or may be one or more voxels that represent a pivotal part of an object modeled by the set of 3D voxel data, such as a unique part that is included only once in the object. Referring additionally to FIG. 5C, a voxel 57A that represents a certain unique part is defined as a rotational origin of the first set of 3D voxel data 55B. In the second set of 3D voxel data 56 also, a voxel 57B representing the same unique part is defined as a rotational origin of the second set of 3D voxel data 56. The rotational-origin voxels 57A and 57B are then registered (aligned), as also shown in FIG. 5C. As before, though FIG. 5C and the following FIG. 5D are in 2D for ease of illustration, the same concept is equally applicable in 3D context as will be apparent to those skilled in the art.

Referring back to FIG. 5A, in step 54, the aligning routine then rotates at least one of the two sets of 3D voxel data about the rotational origin(s) until the two sets of 3D voxel data are aligned. FIG. 5D illustrates four rotational states in which the first set 55B is rotated by 0°, 90°, 180° and 270° clockwise relative to the second set 56B, respectively, about their rotational-origin voxels 57A, 57B. Rotation of a set of 3D voxel data relative to another set of 3D voxel data may be implemented using any suitable rotational matrix, for example. The rotation illustrated in FIG. 5D is for illustrative purposes only and finer rotational angles may be used to produce a larger number of rotational states, such as by rotating at least one of the two sets by 10° increment, 15° increment, etc.

If available, application specific alignment data may be used such as an 'up' vector pointing up from the ground to restrict the rotation sub-routine of steps 52 and 54 described above. If such 'up' vector is known, then the sub-routine need to search through only rotations that result in the 'up' vector still pointing up, which can be represented by rotations about the 'up' vector.

Figure 5D:
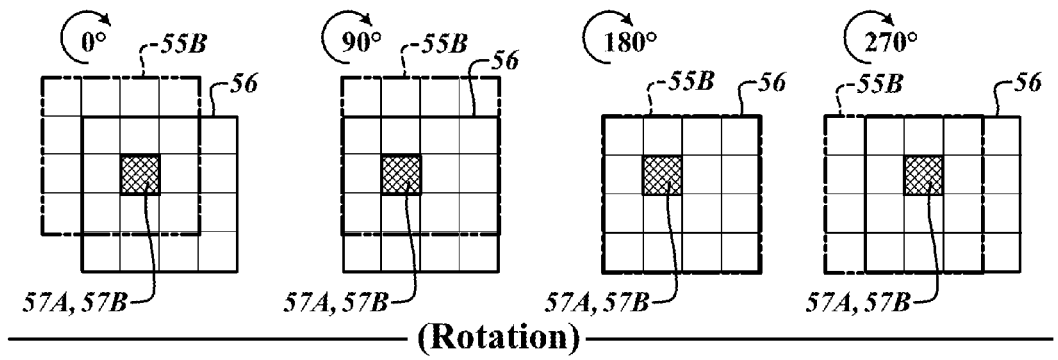

As shown in FIG. 5D, the first set 55B rotated by 180° clockwise relative to the second set 56 achieves the best alignment of the two sets of 3D voxel data 55B and 56. In one embodiment, each of the rotational states (four in FIG. 5D) may be displayed to the user so that the user can visually confirm and select the best aligned rotational state. In another embodiment, the one-to-one comparison routine to be described more fully below in reference to FIGS. 6A-6D is executed in each of the different rotational states to calculate a similarity/dissimilarity value indicative of how similar or dissimilar the two sets of 3D voxel data are. Then, the rotational state having the highest similarity value or the lowest dissimilarity value may be automatically selected as the best aligned rotational state. In further embodiments, user selection and automatic selection of the best aligned rotational state may be used together. For example, the one-to-one comparison routine may be run on a set of rotational states to identify a subset of rotational states having higher similarity values (or lower dissimilarity values), from which the user may select the best aligned rotational state. Alternatively, from a set of rotational states a user may select a subset of rotational states that appear to be better aligned, and the one-to-one comparison routine may be executed on each of the subset to determine the best aligned rotational state having the highest similarity value (or the lowest dissimilarity value).

Figure 6A:
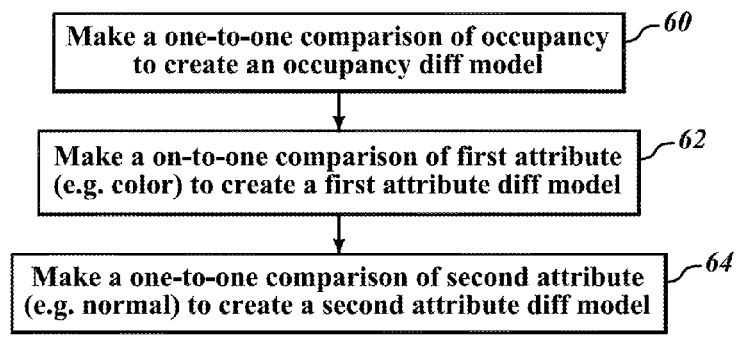
FIG. 6A is a flow chart of a one-to-one comparison subroutine, which is part of the diffing routine of FIG. 4A and which makes a one-to-one comparison between each voxel in the first set of 3D voxel data and a corresponding voxel in the second set of 3D voxel data to create a diff model.

After the two sets of 3D voxel data are aligned (see FIG. 4A, step 40), the diffing algorithm makes a one-to-one comparison of voxels between the first and second sets of 3D voxel data to create a diff model (see FIG. 4A, step 42). FIG. 6A is a flow chart of a one-to-one comparison routine which, when executed by the processor/computer, operates to make a one-to-one comparison between each voxel in the first set of 3D voxel data and a corresponding voxel in the second set of 3D voxel data, according to an embodiment of the present invention. In step 60, the comparison routine makes a one-to-one comparison of occupancy state between each voxel in the first set with a corresponding voxel in the second set to create an occupancy diff model. For example, when an occupied voxel is identified as "1" and an empty voxel is identified as "0," the routine subtracts an occupancy value in each voxel in the first set from an occupancy value in a corresponding voxel in the second set. Thus, a calculated value of "0" indicates that the occupancy state of that voxel position is the same between the two sets, i.e., they are both occupied voxels in the two sets or both empty voxels in the two sets. A calculated value of "1" indicates an added voxel, which is an empty voxel in the first set but is an occupied voxel in the second set. A calculated value of "−1" indicates a deleted voxel, which is an occupied voxel in the first set but is an empty voxel in the second set. Thus, an occupancy diff model may contain values 0 (same), 1 (added) or -1 (deleted) for each of the voxel positions in the two sets of 3D voxel data. Alternatively, any voxel that is not the same between the two sets may be identified by a value "1" without indicating whether it is an added voxel or a deleted voxel. In this case an occupancy diff model may contain values 0 (same) or 1 (different) for each of the voxel positions in the two sets of 3D voxel data.

The sets of 3D voxel data may be organized in various 3D voxel data structures, as disclosed in U.S. Pat. No. 7,050,054 incorporated above. In exemplary embodiments of the present invention, voxel data structures such as an octree (2×2×2 tree) data structure and a 64-tree (4×4×4 tree) data structure may be used to effectively avoid having to process (e.g. compare) empty regions (empty voxels) to thereby significantly speed up the diffing operation. An octree structure is a tree data structure in which each internal node has eight children nodes. Thus, if all eight children nodes (voxels) are empty voxels, their parent node may be flagged as "all empty" such that the parent node including eight empty voxels can be ignored for both storage and comparison processing. In other embodiments, instead of an octree, a higher-order 64-tree data structure may be used, in which each node includes 64 children nodes. When the sets of 3D voxel data are arranged in a 64-tree data structure, if 64 children nodes (voxels) are empty voxels, their parent node may be flagged as "all empty" such that the parent node including 64 empty voxels can be ignored for both storage and comparison processing, to further speed up the diffing operation.

According to various embodiments of the present invention, an occupied or empty state of each voxel is indicated by 1 bit (e.g., 1 for an occupied voxel and 0 for an empty voxel) and the two sets of 3D voxel data are arranged in a 64-tree structure. Corresponding to the use of the 64-tree structure, according to various embodiments of the present invention, a 64-bit architecture processor is used to rapidly make a one-to-one comparison of bits indicative of occupied or empty states of voxels arranged in the 64-tree data structure. Briefly, a 64-bit architecture processor, which has become prevalent in recent years, has an arithmetic logical unit (ALU) data width of 64 bits and also a memory address width of 64 bits. The 64-bit ALU has a bus size of 64 bits such that it can fetch 64 bits of data at a time and can add/subtract/multiply two 64-bit numbers in one instruction. Thus, the 64-bit architecture processor is capable of instantly carrying out a one-to-one comparison between a sequence of 64 bits of 1 (occupied) and 0 (empty) representing the occupancy states of voxels in the first voxel data set and a sequence of 64 bits of 1 and 0 representing the occupancy states of voxels in the second voxel data set. When a routine compares the bits representing occupancy in two arbitrary models A and B, there are four (4) possibilities. A voxel may be in both A and B, representing similarity. A voxel may be in neither A nor B, representing similarity in empty space. A voxel may be in A but not B, representing a voxel that has been removed in B relative to A. A voxel may be in B but not A, representing a voxel that has been added in B relative to A. Note that the latter two cases can be performed by the single fast XOR 'exclusive or' function. The former two cases can be performed by the single fast equality function. Each of the four cases may be important to detect and identify different information.

In general, use of a higher-order N-tree data structure where N is 64 or higher, in combination with use of an N-bit architecture processor (when a higher order bit processor higher than 64-bit becomes available) to process ("duff") 3D voxel models arranged in the N-tree data structure, significantly increase the execution speed of a diffing operation according to various embodiments of the present invention. A higher-order N-tree data structure may include, for example, 5"3=125 tree structure, 3"3=27 tree structure, and 2"3=8 tree structure. In the present description X^3 tree structure includes X nodes each along x, y and z axes. For example, 2×2×2 tree structure includes 2 nodes each along x, y and z axes.

Figure 6B:
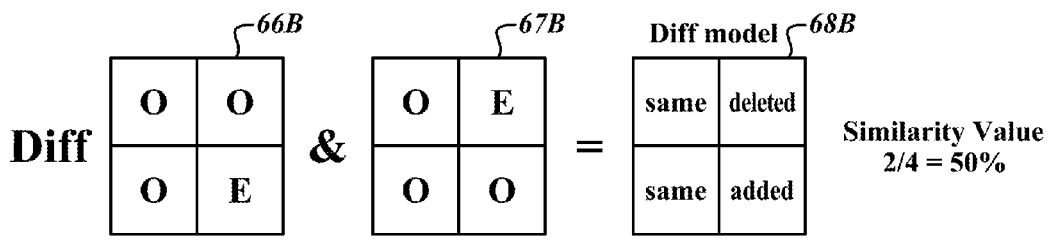
FIGS. 6B-6D illustrate processes of creating an occupancy diff model, a first attribute (e.g., color) diff model, and a second attribute (e.g., normal) diff model, respectively.

FIG. 6B schematically illustrates a diffing operation that compares the occupancy state of each voxel between the first set of 3D voxel data 66B and the second set of 3D voxel data 67B to create an occupancy diff model 68B. As before, FIG. 6B and FIGS. 6C and 6D that follow are in 2D for ease of illustration, though one skilled in the art would readily appreciate that the concept is equally applicable in 3D context. As illustrated, the first set of 3D voxel data 66B includes three occupied voxels marked "O" and one empty voxel marked "E." The second set of 3D voxel data 67B also includes three occupied voxels marked "O" and one empty voxel marked "E" though the positions of the empty voxels "E" differ between the two sets. The resulting occupancy diff model 68B indicates that two voxels that are occupied ("O") in both sets are the "same" while one voxel that is occupied in the first set but is empty in the second set is determined to be "deleted" and one voxel that is empty in the first set but is occupied in the second set is determined to be "added." Because two out of four voxels are the same between the two sets of 3D voxel data, a similarity value may be calculated to be 2/4=50%.

Returning to FIG. 6A, in step 62, optionally, the routine may make an additional one-to-one comparison of a first attribute value, such as a color value, between each voxel in the first set with a corresponding voxel in the second set to create a first attribute (e.g., color) diff model. Color diffing may be advantageous, for example, when change in the expected color might indicate material deterioration, rusting, etc., of an object. In such case, color diffing may be used to provide advance warning signs for potential "problem" areas of the object. As described above, typical 3D voxel data includes position data that indicate which voxels are occupied (1) and which voxels are empty (0), as well as associated attributes data that indicate various attributes of the occupied voxels, such as color, normal, intensity, texture, weight, temperature, density, etc. It is possible for two sets of 3D voxel data to be structurally (position-wise) identical in terms of the number and positions of occupied voxels and empty voxels, while colors of the occupied voxels are different between the two sets. Similarly, it is possible for two sets of 3D voxel data to be structurally identical with their colors also identical while their shininess to be different because normal values associated with the occupied voxels differ between the two sets. Therefore, in some embodiments of the present invention, the one-to-one comparison routine may make an additional one-to-one comparison of an attribute value (e.g., color value, normal vector value) between the two sets of 3D voxel data to create an attribute diff model.

Figure 6C:
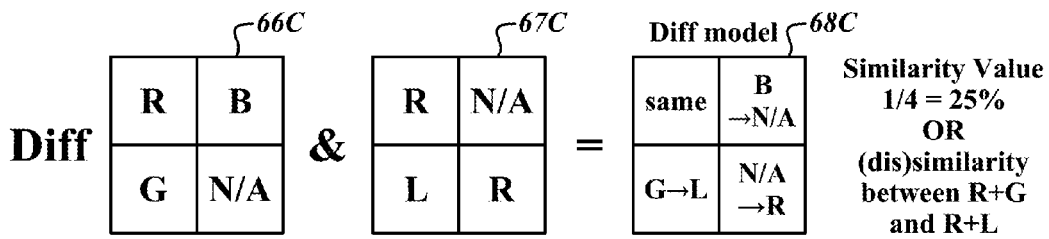

FIG. 6C schematically illustrates a diffing operation that compares the color values (first attributes) of each voxel in the first set 66C and of a corresponding voxel in the second set 67C to create a color diff model 68C. As illustrated, the first set of 3D voxel data 66C includes one voxel with color red ("R"), one voxel with color blue ("B"), one voxel with color green ("G") and one empty voxel for which no color value is defined ("N/A"). The second set of 3D voxel data 67C includes two voxels with color red ("R"), one voxel with color lime ("L") and one empty voxel ("N/A"), though the positions of the empty voxels ("N/A") differ between the two sets. In one example, the diffing operation on color values may subtract a color value of each voxel in the first set from a color value of a corresponding voxel in the second set. The resulting color diff model 68C indicates that one voxel with color red ("R") is the same between the two sets, one voxel color is changed from green ("G") to lime ("L"), one voxel color is changed from blue ("B") to "N/A" (empty voxel), and one voxel color is changed from "N/A" (empty voxel) to red ("R"). Because one out of four voxels has the same color value between the two sets of 3D voxel data, a similarity value of colors between the two sets may be calculated as 1/4=25%.

Various other methods of calculating a similarity/dissimilarity value of colors between the two sets of 3D voxel data are possible. For example, instead of the ratio of the number of voxels having the same color relative to the total number of voxels in the first set of 3D voxel data, a similarity/dissimilarity value may be calculated based on a comparison between the total or average color values of the two sets of 3D voxel data. If one of the color values being compared is "N/A" meaning that it is associated with an empty voxel, such comparison has little meaning and can be omitted. In the example of FIG. 6C, comparison between "B" and "N/A" and comparison between "N/A" and "R" can thus be omitted. The routine then compares a combination of "R" and "G" in the first set against a combination of "R" and "L" in the second set. The comparison can be made between the total color values or the average color values of the two sets of 3D voxel data (or two subsets of 3D voxel data). In the illustrated example, "R" expressed in RGB decimal code is (255, 0, 0), "G" is (0, 128, 0) and "L" is (0, 255, 0). Thus, the total color value of "R" and "G" in the first set can be calculated as (255, 0, 0)+(0, 128, 0)=(255, 128, 0), and the average color value of "R" and "G" can be calculated as (255, 128, 0)/2=(128, 64, 0). Similarly, the total color value of "R" and "L" in the second set can be calculated as (255, 0, 0)+(0, 255, 0)=(255, 255, 0), and the average color value of "R" and "L" can be calculated as (255, 255, 0)/2=(128, 128, 0). In some embodiments, threshold value(s) may be set to ignore small differences in color values as noise, and not to treat them as actual color differences. For example, while "R" in RGB decimal code is (255, 0, 0), a threshold range of +/−5 may be set such that (250, 5, 5), (254, 1, 1), etc., will all be considered "R" in some embodiments.

A dissimilarity value between the total color value (255, 128, 0) of the first set and the total color value (255, 255, 0) of the second set can be calculated as the ratio of the total color difference between the two sets ((255, 255, 0)−(255, 128, 0)=(0, 127, 0)) relative to the total color value of the first set (255, 128, 0), which can be calculated as (0+127+0=127)/(255+128+0=383)=33%. Using the average color values, a dissimilarity value between the average color value (128, 64, 0) of the first set and the average color value (128, 128, 0) of the second set can be calculated as the ratio of the average color difference between the two sets ((128, 128, 0)−(128, 64, 0)=(0, 64, 0)) relative to the average color value of the first set (128, 64, 0), which can be calculated as (0+64+0=64)/(128+64+0=192)=33%.

Returning to FIG. 6A, in step 64, optionally, the routine may make yet another one-to-one comparison of a second attribute value, such as a normal value, between each voxel in the first set with a corresponding voxel in the second set to create a second attribute (e.g., normal) diff model. A normal value of a voxel represents a direction along which the voxel is illuminated and thus defines shine. A normal is typically expressed in a 3D vector form (x, y, z).

Figure 6D:
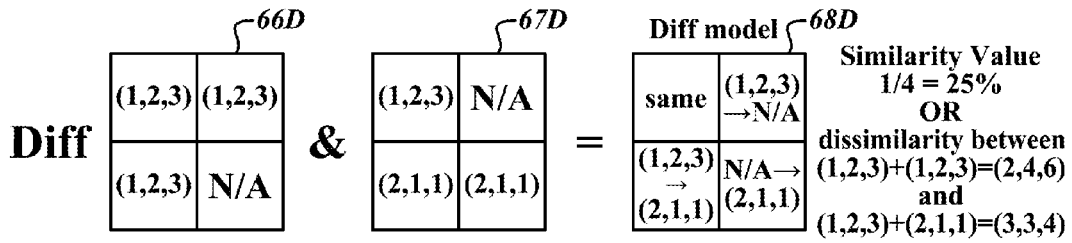

FIG. 6D schematically illustrates a diffing operation that compares the normal values (second attributes) of each voxel in the first set 66D and of a corresponding voxel in the second set 67D to create a normal diff model 68D. As illustrated, the first set of 3D voxel data 66D includes three occupied voxels with normal (1, 2, 3) and one empty voxel associated with no normal value ("N/A"). The second set of 3D voxel data 67D includes one voxel with normal (1, 2, 3), two voxels with normal (2, 1, 1) and one empty voxel ("N/A"), though the positions of the empty voxels ("N/A")

differ between the two sets. As in the color diffing operation described above, the normal diffing operation may subtract a normal value of each voxel in the first set from a normal value of a corresponding voxel in the second set. The resulting normal diff model 68D indicates that one voxel with normal (1, 2, 3) is the same between the two sets, one voxel normal is changed from (1, 2, 3) to (2, 1, 1), one voxel normal is changed from (1, 2, 3) to "N/A" (empty voxel), and one voxel normal is changed from "N/A" (empty voxel) to (2, 1, 1). Because one out of four voxels has the same normal value between the two sets of 3D voxel data, a similarity value of normals between the two sets may be calculated as 1/4=25%. Alternatively, as in the color diffing operation described above, the normal diffing operation may compare a combination of the two normals (1, 2, 3) and (1, 2, 3) in the first set against a combination of the two normal (1, 2, 3) and (2, 1, 1) in the second set, ignoring any voxel position that is empty in either of the two sets. The total normal for the first set can be calculated by adding the two normals (1, 2, 3)+(1, 2, 3)=(2, 4, 6). Similarly, the total normal for the second set can be calculated by adding the two normals (1, 2, 3)+(2, 1, 1)=(3, 3, 4). A dissimilarity value between the total normal (2, 4, 6) of the first set and the total normal (3, 3, 4) of the second set can be calculated as the Euclidian distance between the total normals, i.e., $D^2=(2-3)^2+(4-3)^2+(6-4)^2=1+1+4=6$. In some embodiments, threshold value(s) may be set to ignore small differences in normal values as noise, and not to treat them as actual normal differences. For example, if a square root of a dot product of two normal vectors is +/−10% of the magnitude of one of the normal vectors, the two normal vectors may be considered the same, with their differences ignored as noise. Other methods of calculating a dissimilarity/similarity value between the normals of two sets of 3D voxel data 66D and 67D may also be used as will be apparent to those skilled in the art.

The resulting occupancy diff model 68B, the first attribute (color) diff model 68C and the second attribute (normal) diff model 68D may be stored in combination or otherwise in association with each other. In one embodiment, user execution of a diffing operation generates an occupancy diff model, a first attribute (e.g., color) diff model, a second attribute (e.g., normal) diff model, etc., and the contents of all of the diff models may be displayed to the user for evaluation. In another embodiment, the user may select what types of diff models are to be created and only those selected diff models are created, with their contents displayed to the user. For example, the content of a color diff model may be presented to the user graphically and portions of a first set of 3D voxel model whose colors are changed in a second set of 3D voxel model may be rendered visually distinguishable (e.g., highlighted) and/or numerically in the form of a color similarity/dissimilarity value. As another example, the content of a normal diff model may be presented to the user graphically and portions of a first set of 3D voxel model whose normals are changed in a second set of 3D voxel model may be rendered visually distinguishable (e.g., highlighted) and/or numerically in the form of a normal dissimilarity/similarity value.

Embodiments of a 3D voxel diffing operation described above may be applied in various applications and settings. For example, it may be used to inspect an object by 3D scanning the object to create a first set of 3D voxel data and comparing the created first set against a second set of 3D voxel data that represents an ideal form of the object. Any differences that may be found between the two sets and displayed may be further studied as they may indicate damages to the object or other types of abnormality. In an augmented reality (AR) setting, the differences may be superimposed on an actual image of the object, to allow a viewer to visually verify the current state of the object vis-à-vis the ideal form of the object. For example, differences that may be identified by a diffing operation may define parts/elements/pieces that are missing in an object, such as a part that has been incorrectly removed from the object.

As a further example, 3D diffing may be used in 3D printing to achieve, for example, rapid incremental prototyping of a new product. A product prototype is 3D scanned to generate a 3D voxel model, which a designer may modify/update to generate an updated 3D voxel model. The original 3D voxel model and the updated 3D voxel model are "diffed" to create a diff model that represents the differences between the two 3D voxel models. The diff model, in a 3D printer readable form, may then be loaded to a 3D printer to 3D-print a physical representation of the content of the diff model, which can be appended to the current prototype to create an updated prototype.

As a still further example, the rapid incremental prototyping described above may be used in the context of augmented reality (AR) to inform a designer the precise location at which the 3D-printed material is to be added. For example, an image of the diff model that represents the differences between the two 3D voxel models is superimposed on an actual image of the object to visually indicate the location in the object at which the additional 3D-printed material is to be appended.

Figure 7:
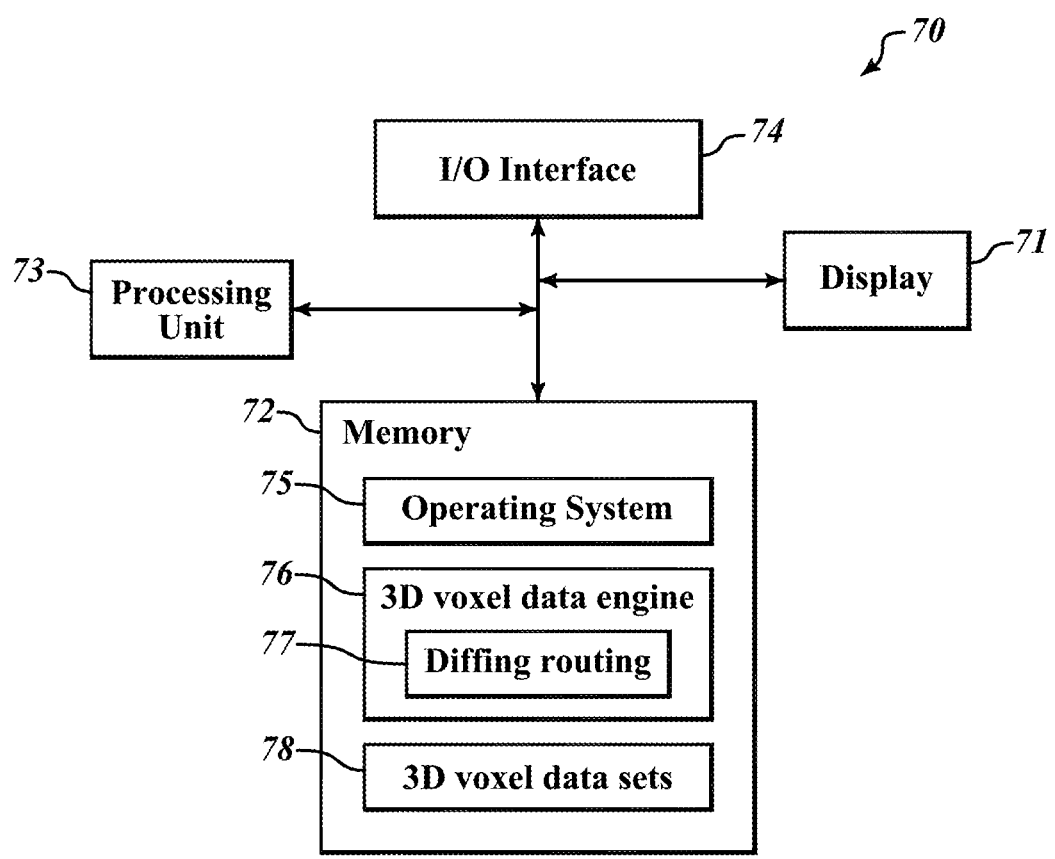
FIG. 7 is a block diagram of several components of a computing device suitable for executing various algorithms such as those of FIGS. 4A, 4B, 5A and 6A, according to exemplary embodiments of the present invention.

FIG. 7 is a block diagram illustrating several of the key components of a computing device 70, which may be used as a system to execute a diffing algorithm to difference two sets of 3D voxel data according to various embodiments of the present invention. Those skilled in the art will appreciate that the computing device 70 may include many more components than those shown in FIG. 7. However, it is not necessary that all of these generally conventional components be shown in order to disclose an enabling embodiment for practicing the invention. As shown in FIG. 7, the computing device 70 includes a display 71, a memory 72, a processing unit 73, and an input/output ("I/O") interface 74, all interconnected via a bus. The display 71 is typically an LCD screen and may be a touch sensitive display in some embodiments. The processing unit 73 is preferably a 64-bit processor to achieve a rapid one-to-one comparison of voxels between two sets of 3D voxel data as described above. The I/O interface 74 is provided for connection to other devices, such as an computer-readable medium, external storage or a network (not shown), from which 3D voxel data sets and/or computer-executable instructions embodying a diffing algorithm may be loaded onto the computing device 70 (or the memory 72). The I/O interface 74 includes the necessary circuitry for such a connection and is constructed for use with the necessary protocols, as will be appreciated by those skilled in the art. The computer-readable medium may be floppy disks, optical disks, USB memory devices, SD cards and other portable memory devices that are currently available and may be available in the future.

The memory 72 generally comprises a random access memory ("RAM"), a read-only memory ("ROM"), a permanent mass storage device, a hard disc drive, tape drive, floppy disc drive, optical disc drive, magneto-optical disc drive, flash memory drive (e.g., USB flash drive), drum memory, or combination thereof, and may also include a removable memory device. The memory 72 may also include cache and registers of, or accessible by, the processing unit 73. The memory 72 stores an operating system 75, a 3D voxel data engine 76 which is a set of computer-executable instructions configured to generate and process (manipulate/display) 3D voxel data, and a database 78 for storing sets of 3D voxel data. The 3D voxel data engine 76 includes a diffing routine 77 configured according to various embodiments of the present invention.

Although the exemplary computing device 70 has been described that generally conforms to a conventional computing device, those skilled in the art will appreciate that the computing device 70 may be any of a great number of devices capable of executing a diffing algorithm according to the present invention. In various exemplary embodiments of the present invention, the computing device 70 does not require specialized hardware. Rather, a standard processor (e.g., a 64-bit processor) is sufficient, as used in a typical desktop or laptop computer or in a mobile device such as a tablet device. Further, a constrained memory, i.e., a limited amount of memory relative to a typical computer graphics rendering system, may be sufficient in most applications.

The various embodiments described above can be combined to provide further embodiments. All of the U.S. patents, international patent applications and non-patent publications referred to in this specification are incorporated herein by reference, in their entirety. Aspects of the embodiments can be modified, if necessary, to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented system comprising:
a display;
a memory configured to be loaded with a first set of 3D voxel data of an object and a second set of 3D voxel data, the two sets of 3D voxel data being arranged in a 64-tree data structure, and an occupied or empty state of each voxel being indicated by 1 bit; and
a 64-bit processor which is coupled to the display and the memory and which, when loaded with computer-executable instructions, executes a 3D voxel diffing algorithm having steps comprising:
  (i) aligning the first set of 3D voxel data and the second set of 3D voxel data;
  (ii) making a one-to-one comparison between each voxel in the first set of 3D voxel data and a corresponding voxel in the second set of 3D voxel data simultaneously, by one-to-one comparing bits indicative of occupied or empty states of voxels arranged in the 64-tree data structure between the first and second sets of 3D voxel data, to create a diff model that records differences found between the first and second sets of 3D voxel data, the differences including additions in which an empty voxel in the first set is changed to an occupied voxel in the second set and deletions in which an occupied voxel in the second set is changed to an empty voxel in the second set; and
  (iii) displaying the content of the diff model on the display including displaying the additions and deletions in a manner visually distinguishable from each other.

2. The computer-implemented system according to claim 1, wherein the 64-bit processor, when loaded with computer-executable instructions, executes an augmented reality (AR) session in which a 3D voxel model of an object is superimposed on an actual image of the object on the display, and the displaying step (iii) comprises displaying differences found between the two sets of 3D voxel data superimposed on the actual image of the object.

3. The computer-implemented system according to claim 2, wherein the displaying step (iii) further comprises displaying a numeric similarity value indicative of similarity between the two sets of 3D voxel data and/or a numeric dissimilarity value indicative of dissimilarity between the two sets of 3D voxel data on the display.

4. A non-transitory computer-readable storage medium including computer-executable instructions which, when loaded to a computing system, execute a routine comprising:
  (i) aligning a first set of 3D voxel data of an object and a second set of 3D voxel data by matching a level of detail (LOD) of the first set and an LOD of the second set;
  (ii) making a one-to-one comparison between each voxel in the first set of 3D voxel data and a corresponding voxel in the second set of 3D voxel data simultaneously to create a diff model that records differences found between the first and second sets of 3D voxel data, the differences including additions in which an empty voxel in the first set is changed to an occupied voxel in the second set and deletions in which an occupied voxel in the second set is changed to an empty voxel in the second set; and
  (iii) displaying the content of the diff model on a display including displaying the additions and deletions in a manner visually distinguishable from each other.

5. The medium according to claim 4, wherein the two sets of 3D voxel data are arranged in a 64-tree data structure.

6. The medium according to claim 4, wherein the LOD is defined as an actual dimension of the object divided by a number of voxels to which the actual dimension is mapped.

7. The medium according to claim 4, wherein the aligning step (i) further comprises:
  (i-a) modifying one of the two sets of 3D voxel data having a higher LOD to have a lower LOD that matches the LOD of the other set; and
  (i-b) rotating at least one of the two sets relative to the other set to align the two sets.

8. The medium according to claim 7, wherein step (i-b) comprises one or both of: (i-b1) determining whether the two sets are aligned based on a user feedback, and (i-b2) determining whether the two sets are aligned based on a numeric similarity value indicative of similarity between the two sets of 3D voxel data and/or a numeric dissimilarity value indicative of dissimilarity between the two sets of 3D voxel data calculated based on a one-to-one comparison between each voxel in the first set of 3D voxel data and a corresponding voxel in the second set of 3D voxel data.

9. The medium according to claim 4, wherein the aligning step (i) further comprises:
  (i-a) aligning the first set of 3D voxel data and the second set of 3D voxel data at a lower level of detail (LOD), and making a one-to-one comparison between each voxel in the first set of 3D voxel data and a corresponding voxel in the second set of 3D voxel data to calculate a first numeric similarity value indicative of similarity between the two sets at the lower LOD and/or a first numeric dissimilarity value indicative of dissimilarity between the two sets at the lower LOD;

(i-b) aligning the first set of 3D voxel data and the second set of 3D voxel data at a higher level of detail (LOD), and making a one-to-one comparison between each voxel in the first set of 3D voxel data and a corresponding voxel in the second set of 3D voxel data to calculate a second numeric similarity value indicative of similarity between the two sets at the higher LOD and/or a second numeric dissimilarity value indicative of dissimilarity between the two sets at the higher LOD; and (i-c) selecting the two sets of 3D voxel data at the lower LOD for further processing if the first and second numeric similarity values are the same or close within a defined range and/or the first and second numeric dissimilarity values are the same or close within a defined range.

10. The medium according to claim 4, wherein the comparison step (ii) comprises comparing an occupancy state of each voxel in the first set of 3D voxel data with an occupancy state of a corresponding voxel in the second set of 3D voxel data to create an occupancy diff model that records differences in occupancy states, which are either occupied or empty, between the first and second sets of 3D voxel data.

11. The medium according to claim 4, wherein the comparison step (ii) comprises comparing an attribute value of each voxel in the first set of 3D voxel data with an attribute value of a corresponding voxel in the second set of 3D voxel data to create an attribute diff model that records differences in attribute values between the first and second sets of 3D voxel data.

12. The medium according to claim 11, wherein the attribute value is selected from a group consisting of a color value, a normal value, and an intensity value.

13. The medium according to claim 4, wherein the displaying step (iii) comprises one or both of: (iii-a) graphically representing differences found between the first and second sets of 3D voxel data, and (iii-b) displaying a numeric similarity value indicative of similarity between the two sets of 3D voxel data and/or a numeric dissimilarity value indicative of dissimilarity between the two sets of 3D voxel data.

14. The medium according to claim 13, wherein the numeric similarity value is calculated as the ratio of a number of voxels that are identical between the two sets relative to a total number of voxels in one of the two sets.

15. The medium according to claim 13, wherein the numeric dissimilarity value is calculated as the ratio of a number of voxels that differ between the two sets relative to a total number of voxels in one of the two sets.

16. A computer-implemented method comprising:
(i) loading, to a memory device, a first set of 3D voxel data of an object and a second set of 3D voxel data;
(ii) executing a diffing routine on a processor coupled to the memory device, the diffing routine including:

(a) aligning a first set of 3D voxel data of an object and a second set of 3D voxel data by matching a level of detail (LOD) of the first set and an LOD of the second set;
(b) making a one-to-one comparison between each voxel in the first set of 3D voxel data and a corresponding voxel in the second set of 3D voxel data simultaneously to create a diff model that records differences found between the first and second sets of 3D voxel data, the differences including additions in which an empty voxel in the first set is changed to an occupied voxel in the second set and deletions in which an occupied voxel in the second set is changed to an empty voxel in the second set; and
(c) displaying the content of the diff model on a display coupled to the processor including displaying the additions and deletions in a manner visually distinguishable from each other.

17. The computer-implemented method according to claim 16 implemented in an augmented reality (AR) session, wherein the first set of 3D voxel data represents an ideal form of the object and the second set of 3D voxel data represents a current form of the object as scanned by a 3D scanner, and the displaying step (ii)(c) comprises displaying differences found between the first and second sets of 3D voxel data superimposed on an actual image of the objet.

18. The computer-implemented method according to claim 16 implemented in an augmented reality (AR) session that instructs a user to add, remove or modify a part of the object, wherein the first set of 3D voxel data represents the object before the user adds, removes or modifies the part as scanned by a 3D scanner and the second set of 3D voxel data represents the object after the user adds, removes or modifies the part as scanned by the 3D scanner, and the displaying step (ii)(c) comprises displaying differences between the first and second sets of 3D voxel data that represent the user's addition, removal or modification of the part superimposed on an actual image of the object.

19. The computer-implemented method according to claim 18 implemented in an AR session, wherein adding, removing or modifying a part is carried out as a step within a process of assembling and/or disassembling the object, and the displaying step (ii)(c) enables the user to verify proper execution of the process of assembling and/or disassembling the object.

20. The computer-implemented method according to claim 16, further comprising:
(d) using the diff model created in the comparison step (ii)(b) in a 3D printer to form a physical representation of the content of the diff model.

21. The computer-implemented method according to claim 20 implemented in an augmented reality (AR) session, wherein the displaying step (ii)(c) comprises displaying the content of the diff model on the display to indicate a location in the object at which the physical representation printed by the 3D printer is to be appended.

* * * * *